United States Patent
Small et al.

(10) Patent No.: US 12,335,885 B2
(45) Date of Patent: Jun. 17, 2025

(54) METHODS AND APPARATUS FOR IMPROVING THE RESILIENCE OF A POSITIONING NETWORK

(71) Applicant: LOCATA CORPORATION PTY LTD, Bruce (AU)

(72) Inventors: David Small, Numeralla (AU); Arved Brasch, Coombs (AU); Ian Sainsbery, Scullin (AU); John Gordon, Bruce (AU)

(73) Assignee: LOCATA CORPORATION PTY LTD, Bruce (AU)

( * ) Notice: Subject to any disclaimer, the term of this patent is extended or adjusted under 35 U.S.C. 154(b) by 367 days.

(21) Appl. No.: 17/776,313

(22) PCT Filed: Dec. 2, 2020

(86) PCT No.: PCT/AU2020/051312
§ 371 (c)(1),
(2) Date: May 12, 2022

(87) PCT Pub. No.: WO2021/108854
PCT Pub. Date: Jun. 10, 2021

(65) Prior Publication Data
US 2022/0400453 A1  Dec. 15, 2022

(30) Foreign Application Priority Data

Dec. 3, 2019  (AU) .................. 2019904566

(51) Int. Cl.
*H04W 56/00*  (2009.01)
*H04W 64/00*  (2009.01)
(52) U.S. Cl.
CPC ......... *H04W 56/001* (2013.01); *H04W 64/00* (2013.01)

(58) Field of Classification Search
None
See application file for complete search history.

(56) References Cited

U.S. PATENT DOCUMENTS

| 629,250 A | 7/1899 | Henretty |
|---|---|---|
| 6,466,608 B1 | 10/2002 | Hilton et al. |

(Continued)

FOREIGN PATENT DOCUMENTS

| CN | 104115025 A1 | 10/2014 |
|---|---|---|
| CN | 107113760 A | 8/2017 |

(Continued)

OTHER PUBLICATIONS

International Search Report of PCT/AU2020/051312 dated Feb. 5, 2021.

(Continued)

*Primary Examiner* — Frantz Bataille
(74) *Attorney, Agent, or Firm* — MATTINGLY & MALUR, PC (57) ABSTRACT

Methods and apparatus are provided for improving the resilience of a network of positioning-unit devices to failure of the reference device that controls the network timebase via timing information in its signal. In certain embodiments a predetermined one of the positioning-unit devices is configured to monitor the reference signal, assess serviceability of that signal and take control of the network if it determines that signal is unserviceable. Continuity of network synchronisation is thereby maintained despite the reference signal being unserviceable. Preferably the predetermined positioning-unit device is configured to obtain information on the reference signal from at least one other positioning-unit device for assessing reference signal serviceability. If the reference device recovers from a failure it can re-enter the network by synchronising its signal to a signal from one of the positioning-unit devices, and may then negotiate with (Continued)

the predetermined positioning-unit device to resume control of the network.

28 Claims, 5 Drawing Sheets

(56) References Cited

U.S. PATENT DOCUMENTS

| | | | |
|---|---|---|---|
| 6,542,754 | B1 | 4/2003 | Sayers et al. |
| 2009/0002230 | A1 | 1/2009 | Kee et al. |
| 2009/0047976 | A1 | 2/2009 | Fujii et al. |
| 2011/0285589 | A1 | 11/2011 | Bull et al. |
| 2013/0287067 | A1 | 10/2013 | Grobert et al. |
| 2014/0119390 | A1 | 5/2014 | Rabinovich |
| 2014/0378161 | A1 | 12/2014 | Sellier et al. |
| 2015/0092754 | A1 | 4/2015 | Gupta |
| 2015/0168532 | A1* | 6/2015 | Hampel .................. H04W 4/02 342/450 |
| 2016/0187458 | A1 | 6/2016 | Shah et al. |
| 2018/0159640 | A1* | 6/2018 | Taher .................. H04B 17/364 |

FOREIGN PATENT DOCUMENTS

| | | |
|---|---|---|
| EP | 2195949 A1 | 6/2010 |
| JP | 08-237182 A | 9/1996 |
| JP | 08-289359 A | 11/1996 |
| JP | 2009-047457 A | 3/2009 |
| WO | 03/038469 A1 | 5/2003 |
| WO | 2009030292 A1 | 3/2009 |
| WO | 2016/011505 A1 | 1/2016 |

OTHER PUBLICATIONS

Chinese Office Action received in corresponding Chinese Application No. 202080082645.8 dated Aug. 19, 2024.
Japanese Office Action received in corresponding Japanese Application No. 2022-532648 dated Oct. 15, 2024.
Extended European Search Report received in corresponding European Application No. 20895145.9 dated Dec. 5, 2023.
Singaporean Office Action received in corresponding Singaporean Application No. 11202205580X dated Dec. 23, 2024.
Indian Office Action received in corresponding Indian Application No. 202227026324 dated Mar. 12, 2025.

* cited by examiner

METHODS AND APPARATUS FOR IMPROVING THE RESILIENCE OF A POSITIONING NETWORK

FIELD OF THE INVENTION

The present invention relates to methods and apparatus for improving the resilience of positioning networks, in particular for positioning networks in which the sources of positioning signals synchronise their positioning signals to a reference signal received from a designated reference device. However it will be appreciated that the invention is not limited to this particular field of use.

RELATED APPLICATIONS

The present application claims priority from Australian provisional patent application No 2019904566, filed on 3 Dec. 2019, the contents of which are incorporated herein by reference in their entirety.

BACKGROUND OF THE INVENTION

Any discussion of the prior art throughout this specification should in no way be considered as an admission that such prior art is widely known or forms part of the common general knowledge in the field.

Published PCT application No WO 03/038469 A1, the contents of which are incorporated herein by reference, discloses methods and systems for generating precise position solutions for a mobile apparatus using positioning signals transmitted from a synchronised network of ground-based transceivers known as positioning-unit devices. Each positioning-unit device uses a so-called Time Lock Loop (TLL) to measure and correct timing errors with respect to the timebase of a designated reference transmitter, thereby establishing and maintaining a network of positioning-unit devices transmitting positioning signals that are chronologically synchronised to the reference transmitter timebase. Once a given positioning-unit device has been synchronised to the reference transmitter timebase, it can relay the timebase to further positioning-unit devices that do not have a clear view of the designated reference transmitter, thereby propagating the timebase through an extended network of positioning-unit devices.

The TLL methodology disclosed in WO 03/038469 A1 requires the reference transmitter and the positioning-unit devices to be in known and fixed locations with respect to a reference coordinate system. Published patent application No WO 2016/011505 A1, the contents of which are incorporated herein by reference, discloses an extension of the TLL methodology to deal with situations where the reference transmitter and a positioning-unit device are moving relative to each other. Generally, the reference transmitter or the positioning-unit device self-monitor their location and velocity, e.g. using inertial navigation systems or position receivers, and broadcast that information in their positioning signals. The velocity information enables estimation of Doppler shifts imposed on the positioning signals by the relative motion, while the location information enables estimation of propagation delay for the positioning signals.

The TLL synchronisation process comprises frequency alignment and time alignment steps, with the frequency alignment step preferably performed first so that the signal of a positioning-unit device is frequency coherent with the signal of the designated reference device, before the signals are aligned in time. In simple terms, the frequency alignment step ensures that the internal clock of a positioning-unit device is 'ticking' at the same rate as the reference transmitter clock. To prevent clock drift and loss of synchronisation with the reference transmitter it is generally necessary for the positioning-unit devices to actively maintain frequency alignment between their positioning signals and the reference signal. However if the designated reference transmitter were to cease transmitting the reference signal, e.g. because of a power cut or hardware failure, the positioning-unit devices would have to stop transmitting their positioning signals, otherwise they would lose synchronisation with consequent failure of the positioning network as their clocks drifted independently. Furthermore the positioning-unit devices would be unable to synchronise themselves if the reference transmitter were to fail at network start-up.

In the description herein and in the claims that follow, the terms 'comprising', 'comprises' and the like are to be interpreted in an inclusive sense, synonymous with the terms 'including', 'includes' and the like. For example the expression 'an apparatus comprising A and B' should not be limited to apparatus consisting only of elements A and B. Similarly, the term 'or' is to be interpreted in an inclusive rather than an exclusive sense.

For example unless the context clearly requires otherwise, the expression 'A or B' is to be interpreted as meaning A, or B, or both A and B.

OBJECT OF THE INVENTION

It is an object of the present invention to overcome or ameliorate at least one of the disadvantages of the prior art, or to provide a useful alternative.

It is an object of the present invention in a preferred form to provide a positioning network comprising a plurality of positioning-unit devices synchronised to a timebase of a reference device, having improved resilience to failure of the reference device.

SUMMARY OF THE INVENTION

According to a first aspect of the present invention there is provided a positioning network comprising:
  a reference device configured to generate and transmit a reference signal according to a timebase for said reference device; and
  a plurality of positioning-unit devices, each of said positioning-unit devices being configured to generate a unique positioning signal and chronologically synchronise said unique positioning signal to said reference signal,
  wherein a predetermined one of said positioning-unit devices is configured to:
  (i) monitor said reference signal;
  (ii) assess the serviceability of said reference signal; and
  (iii) take control of the positioning network in the event it determines that said reference signal is unserviceable, such that other positioning-unit devices can chronologically synchronise their unique positioning signals to the unique positioning signal of the predetermined positioning-unit device, thereby maintaining or establishing synchronisation of said network despite said reference signal being unserviceable.

In certain embodiments the monitoring of the reference signal comprises measuring a quality of the reference signal as received at the predetermined positioning-unit device. In preferred embodiments the predetermined positioning-unit device is configured to obtain information on the reference signal from at least one other of the positioning-unit devices, for use in assessing the serviceability of the reference signal. The information may comprise one or more measurements of a quality of the reference signal, or an assessment of the serviceability of the reference signal. The assessment may be based on one or more measurements of a quality of the reference signal.

In preferred embodiments the predetermined positioning-unit device is configured to obtain information on the reference signal from one or more other positioning-unit devices that routinely receive the reference signal and routinely receive the unique positioning signal from the predetermined positioning-unit device. In certain embodiments each of the other positioning-unit devices is configured to determine that it routinely receives a signal if it has received that signal for at least a predetermined percentage of a preceding predetermined time period. Preferably, each of the other positioning-unit devices is configured to broadcast whether it routinely receives the reference signal or the unique positioning signal from the predetermined positioning-unit device.

In certain embodiments the quality of the reference signal comprises received signal power, signal-to-noise ratio or signal continuity.

In certain embodiments the reference device is configured, when starting up, to: search for unique positioning signals from one or more of the positioning-unit devices; and synchronise its signal to a selected one of the unique positioning signals if it detects that unique positioning signal within a first predetermined start-up period. The reference device is preferably configured to synchronise its signal to the unique positioning signal of the predetermined positioning-unit device if that signal is detected. The reference device and the predetermined positioning-unit device may be configured to negotiate return of control of the positioning network to the reference device after the reference device has synchronised its signal to one of the unique positioning signals.

In certain embodiments the reference device and the predetermined positioning-unit device are configured to be able to receive the timebase from an external source, such that the timebase can be transferred to the plurality of positioning-unit devices or to one or more position receivers.

According to a second aspect of the present invention there is provided, in a positioning network comprising a reference device configured to generate and transmit a reference signal according to a timebase for said reference device, and a plurality of positioning-unit devices each configured to generate a unique positioning signal and chronologically synchronise said unique positioning signal to said reference signal, a method for maintaining or establishing synchronisation of said positioning-unit devices in the absence of a serviceable reference signal, said method comprising the steps of a predetermined one of said positioning-unit devices:

(i) monitoring said reference signal;
(ii) assessing the serviceability of said reference signal; and
(iii) taking control of the positioning network in the event it determines that said reference signal is unserviceable, such that other positioning-unit devices can chronologically synchronise their unique positioning signals to the unique positioning signal of said predetermined positioning-unit reference device, thereby maintaining or establishing synchronisation of said network despite said reference signal being unserviceable.

In certain embodiments the step of monitoring the reference signal comprises measuring a quality of the reference signal as received at the predetermined positioning-unit device. In preferred embodiments the step of monitoring the reference signal comprises obtaining information on the reference signal from at least one other of the positioning-unit devices, for use in assessing the serviceability of the reference signal. The information may comprise one or more measurements of a quality of the reference signal, or an assessment of the serviceability of the reference signal. The assessment may be based on one or more measurements of a quality of the reference signal.

In preferred embodiments the predetermined positioning-unit device obtains information on the reference signal from one or more other positioning-unit devices that routinely receive the reference signal and routinely receive the unique positioning signal from the predetermined positioning-unit device. In certain embodiments each of the other positioning-unit devices determines that it routinely receives a signal if it has received that signal for at least a predetermined percentage of a preceding predetermined time period.

Preferably, each of the other positioning-unit devices broadcasts whether it routinely receives the reference signal or the unique positioning signal from the predetermined positioning-unit device.

In certain embodiments the quality of the reference signal comprises received signal power, signal-to-noise ratio or signal continuity.

In certain embodiments the reference device, when starting up: searches for unique positioning signals from one or more of the positioning-unit devices; and synchronises its signal to a selected one of the unique positioning signals if it detects that unique positioning signal within a first predetermined start-up period. The reference device preferably synchronises its signal to the unique positioning signal of the predetermined positioning-unit device if that signal is detected. The reference device and the predetermined positioning-unit device may negotiate return of control of the positioning network to the reference device after the reference device has synchronised its signal to one of the unique positioning signals.

In certain embodiments the reference device and the predetermined positioning-unit device are able to receive the timebase from an external source, such that the timebase can be transferred to the plurality of positioning-unit devices or to one or more position receivers.

BRIEF DESCRIPTION OF THE DRAWINGS

A preferred embodiment of the invention will now be described, by way of example only, with reference to the accompanying drawings in which.

DETAILED DESCRIPTION

Overview of TLL Synchronization Process

Figure 1:
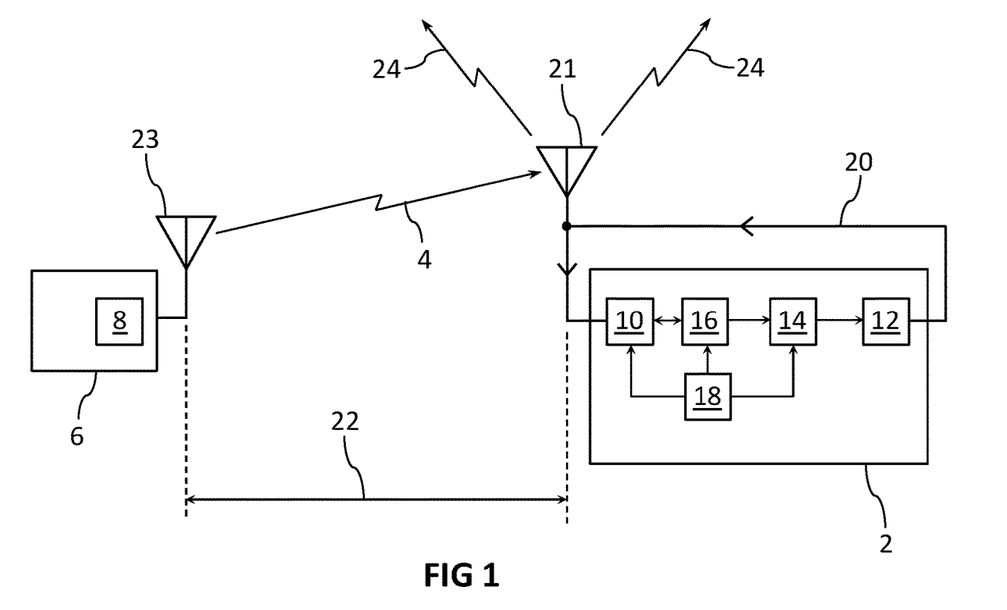
FIG. 1 illustrates a positioning-unit device synchronising its positioning signal to the timebase of a reference device.

The Time Lock Loop (TLL) process disclosed in the abovementioned WO 03/038469 A1 will be discussed briefly with reference to FIG. 1. A positioning-unit device 2 in a fixed and known location with respect to a reference coordinate system, such as the Earth Centered Earth Fixed (ECEF) coordinate system, receives a reference signal 4 transmitted by a reference device 6 in another fixed and known location, and synchronises itself to a timebase determined by an internal clock 8 of the reference device. The positioning-unit device 2 incorporates a receiver 10, a transmitter 12, a steered transmitter clock 14, a CPU 16 and an oscillator 18. Once the positioning-unit device 2 receives the reference signal 4 it transmits a slave version of a positioning signal 20 from its transmitter 12, which is received by its receiver 10. Each of the reference signal 4 and the slave positioning signal 20 has a carrier component, a pseudo-random code component and a data component. The receiver 10 simultaneously receives and samples the reference signal 4 and slave positioning signal 20 and measures an integrated carrier phase (ICP) difference between the two signals. The CPU 16 zeros the ICP measurements of the reference and slave positioning signals 4, 20 within the receiver 10, then engages a control loop that continuously applies corrections to the steered transmitter clock 14 to maintain the ICP difference at zero, so that the slave positioning signal 20 has frequency coherence with the reference signal 4.

Once frequency coherence is achieved, the time difference observed between the pseudo-random code and data components of the reference and slave positioning signals 4, 20 becomes constant. This time difference comprises the propagation time delay, calculated from the known geometric distance 22 between the positioning-unit device antenna 21 and the reference device antenna 23, and a time offset, also known as a time bias, between the steered transmitter clock 14 and the reference device clock 8. The time bias can then be corrected to bring the reference and slave positioning signals 4, 20 into chronological alignment.

When the slave positioning signal 20 has frequency coherence with the reference signal 4 and is chronologically aligned with the reference device's timebase, it is fully synchronised to the reference device's timebase. The transmitter 12 then increases the intensity of the slave positioning signal 20, which now becomes a positioning signal 24 unique to the positioning-unit device 2. Recalling that the reference and positioning signals 4, 24 each have a carrier component, a pseudo-random code component and a data component, these signals are unique to each device and therefore distinguishable, typically by virtue of their pseudo-random (PRN) codes or information in their data components.

Figure 2:
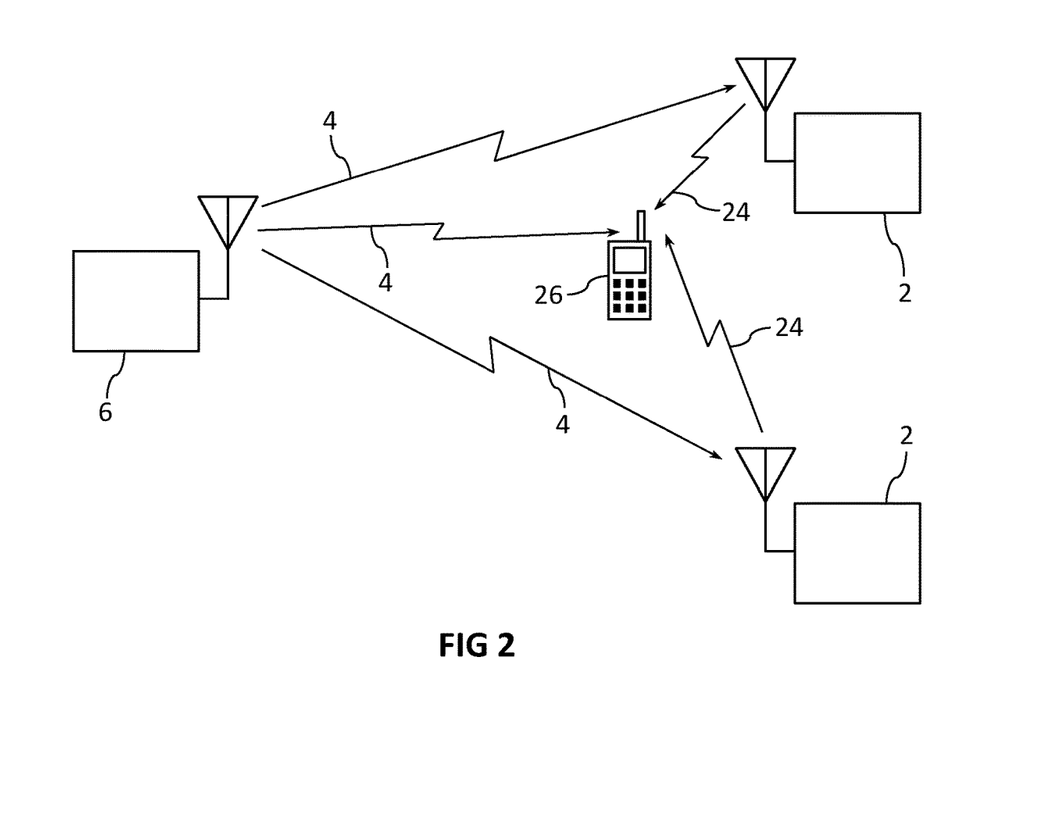
FIG. 2 illustrates a positioning network comprising a reference device and a plurality of synchronised positioning-unit devices, in which a roving position receiver can determine a position solution.

With reference to FIG. 2, a mobile apparatus in the form of a roving position receiver 26 situated within a network comprising a reference device 6 and chronologically synchronised positioning-unit devices 2 can receive positioning signals 24 from the positioning-unit devices, and possibly also the reference signal 4, and autonomously calculate code or carrier-based position solutions. More generally, a roving position receiver can calculate position solutions utilising positioning signals from any positioning-unit devices in view, with signals from three or more positioning-unit devices typically being required. Further implementation details of a chronologically synchronised positioning network, e.g. on the transmission and interpreting of CDMA positioning signals and on device hardware, are described in the above mentioned PCT publication WO 03/038469 A1.

Synchronised Positioning Networks with Improved Resilience

It will be appreciated from the foregoing description of the TLL synchronisation process that for a given positioning-unit device to remain synchronised to the timebase of the designated reference device, it must continue to receive the timebase encoded in the reference signal, either directly if it has a clear view of the reference device or cascaded through one or more intermediary positioning-unit devices. If the reference device were to cease transmitting the reference signal, or if the reference signal for some reason becomes otherwise unusable, the positioning-unit device clocks would begin to drift in individual and unpredictable fashion, resulting in loss of network synchronisation. This may occur in a matter of seconds if the positioning-unit devices have relatively inexpensive clocks such as temperature-controlled crystal oscillators (TCXOs), more slowly if they have more stable clocks, but the end result is that the accuracy of position solutions calculated by roving position receivers will quickly be compromised unless the network is shut down.

Figure 3:
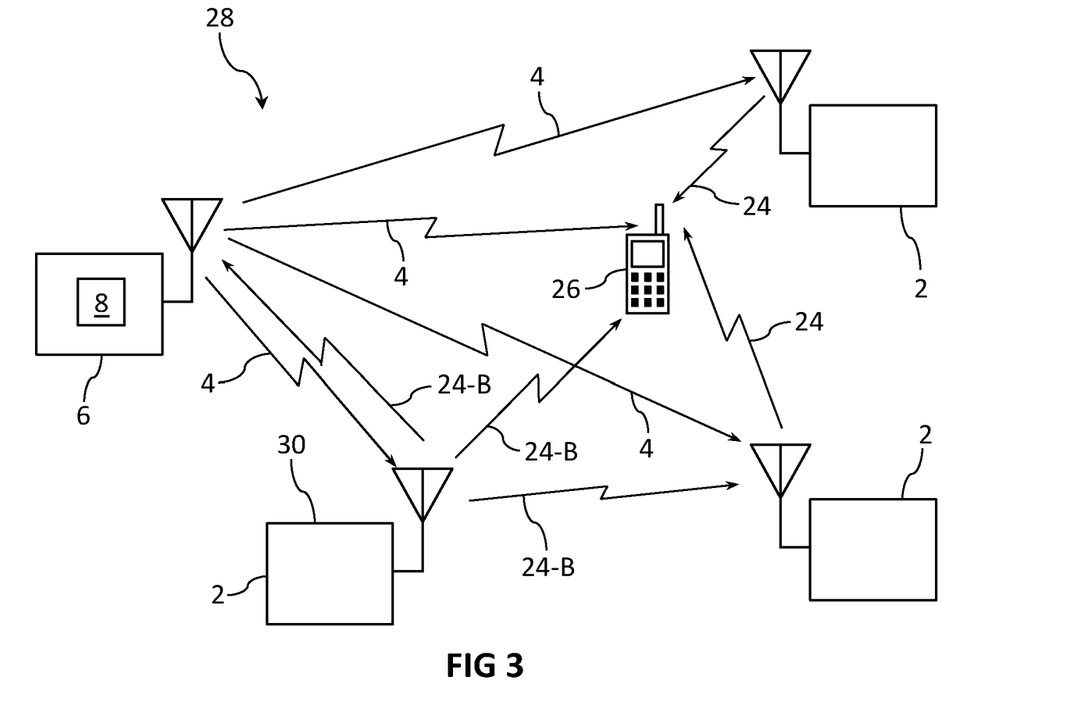
FIG. 3 illustrates a positioning network according to an embodiment of the present invention.

FIG. 3 depicts a positioning network 28 with improved resilience according to an embodiment of the present invention. The network 28 comprises a reference device 6 configured to generate and transmit a reference signal 4 according to a timebase derived from an internal clock 8, and a plurality of positioning-unit devices 2. Each positioning-unit device 2 is configured to generate a unique positioning signal 24 and chronologically synchronise its unique positioning signal to the reference signal 4, enabling a roving position receiver 26 to determine its position using received positioning signals 24, possibly including the reference signal 4. The network 28 is said to be under the control of the reference device 6 when the positioning-unit devices 2 are synchronising their unique positioning signals 24 to the reference signal 4, either directly or via one or more intermediary positioning-unit devices.

To provide the network 28 with improved resilience, a predetermined one of the positioning-unit devices 2 is designated as an 'alternate reference device' 30 and configured to: monitor the reference signal 4; assess the serviceability of the reference signal; and assume control of the network 28 in the event it determines that the reference signal 4 is unserviceable. Generally, this will be as the result of a partial or complete failure of the reference device 6 and may manifest as a total loss of the reference signal 4, or the reference signal being weak, noisy or intermittent. The reference device 6 may fail during normal post-synchronisation operation of the network 28, in which case the positioning signals 24 of the positioning-unit devices 2, including the positioning signal 24-B of the alternate reference device 30, should already have been synchronised to the reference signal 4, or during start-up of the network 28. Once the alternate reference device 30, i.e. the predetermined positioning unit device, has assumed control of the network, the other positioning-unit devices 2 will be able to chronologically synchronise their positioning signals 24 to, or maintain synchronisation with, the positioning signal 24-B transmitted by the alternate reference device 30. Continuity of network synchronisation can thereby be maintained despite the reference signal 4 being or becoming unserviceable. Additionally, the network 28 will be able to start up despite failure of the reference device 6. During normal network operation, however, the reference device 6 is the 'active reference' and the alternate reference device 30 synchronises its unique positioning signal 24-B to the reference signal 4.

In preferred embodiments the reference device 6 and alternate reference device 30 are positioning-unit devices designated with special status before network start-up. Preferably, the reference and alternate reference devices include this status information in the data component of their signals 4, 24-B. Alternatively or additionally the other positioning-unit devices 2 are provided with information regarding the identity of the reference and alternate reference devices 6, 30 before network start-up. The choice of reference device 6 and alternate reference device 30 from among a plurality of positioning-unit devices 2 can be influenced by several factors. For example if the positioning-unit devices are equipped with directional antennas rather than omnidirectional antennas it will generally be advantageous to choose as the reference device 6 a positioning-unit device at or close to an edge of the network 28 with a clear view of a large number of other positioning-unit devices 2. Similar considerations apply to the choice of the alternate reference device 30. It is preferred to choose as alternate reference device 30 a positioning-unit device 2 that is able to receive the reference signal 4 directly. Equally, the reference device 6 should be able to receive the unique positioning signal 24-B directly from the alternate reference device 30, as shown in FIG. 3. Positioning-unit devices 2 that are not designated as the reference device 6 or alternate reference device 30 may be conveniently referred to as 'slaves'. The alternate reference device 30 is said to be in 'slave mode' when its positioning signal 24-B is synchronised to the reference signal 4 transmitted by the reference device 6, and likewise the reference device 6 is said to be in 'slave mode' when its signal 4 is synchronised to the signal 24-B transmitted by the alternate reference device 30.

Figure 4:
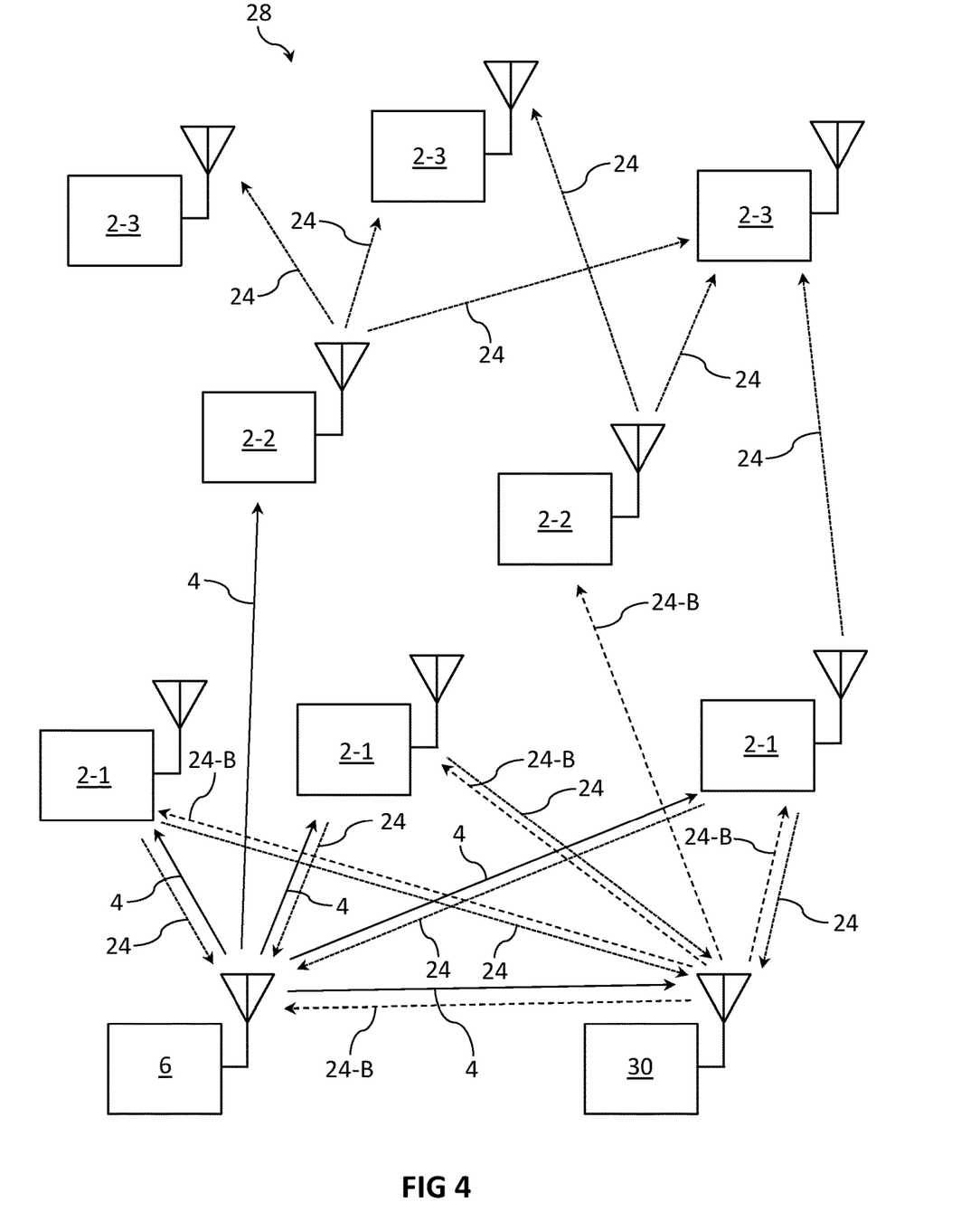
FIG. 4 illustrates a positioning network according to an embodiment of the present invention, showing a classification of the positioning-unit devices.

FIG. 4 depicts a positioning network 28 comprising a reference device 6, an alternate reference device 30 and a number of positioning-unit devices or 'slaves' 2 that can be divided into a number of categories. In particular, slaves that routinely receive signals 4, 24-B from both the reference device 6 and the alternate reference device 30 are categorised as 'Tier 1 slaves' 2-1. In small networks it may be the case that all of the slaves are Tier 1 slaves. By reciprocity it can be expected that both the reference and alternate reference devices 6, 30 will routinely receive signals 24 from Tier 1 slaves 2-1. Slaves that routinely receive signals from the reference device 6 or the alternate reference device 30, but not from both, may be categorised as 'Tier 2 slaves' 2-2, while those that do not routinely receive signals from either the reference device 6 or the alternate reference device 30 may be categorised as 'Tier 3 slaves' 2-3. Tier 3 slaves receive the network timebase, derived from the reference device 6 or the alternate reference device 30 as the case may be, indirectly via the signals 24 of other, already synchronised slaves. As explained below, it is preferred for an operational positioning network 28 to have at least one Tier 1 slave 2-1 at all times. More preferably there will be several Tier 1 slaves 2-1 in an operational network 28.

In preferred embodiments the reference device 6, alternate reference device 30 and slaves 2 of an operational network 28 are in routine or constant communication with each other, e.g. for exchange of status data or intentions, via information included in the data components of their signals. In other embodiments they may communicate via other means such as a wired or wireless local area network. Status data broadcast via wireless or wired means by the reference device 6 may for example comprise data regarding its identity and whether it is currently the 'active reference', and likewise for the alternate reference device 30. In preferred embodiments the slaves 2 routinely include, in the data component of their signals 24, information regarding (i) their tier status and (ii) information on the status of signals 4, 24-B received from the reference or alternate reference devices 6, 30. In other embodiments the slaves provide this information when polled by either the reference device 6 or the alternate reference device 30. Information from a Tier 1 slave indicating that it is not currently receiving a serviceable reference signal 4, or that the reference signal is particularly weak, excessively noisy or intermittent may, for example, suggest that there is a problem with the reference device 6.

The tier status of a given slave 2 may vary during operation of a network 28, e.g. if signals from the reference or alternate reference devices 6, 30 are temporarily occluded. In dynamic networks such as those described in WO 2016/011505 A1, tier status may also vary as slaves or reference devices move. For example if a Tier 1 slave were to move to a position where it no longer routinely receives the reference signal 4, or not receive the reference signal at all, it would demote itself from Tier 1 status and change the information it provides accordingly.

In certain embodiments, for the purposes of determining its tier status each slave 2 is configured to determine that it routinely receives a signal if it has been receiving that signal for at least a predetermined percentage of a preceding predetermined time period. In a dynamic network for example, where the tier status of slaves can be expected to vary, a given slave 2 may determine that it routinely receives the reference signal 4 if it has received that signal for at least 75% of the preceding 10 minutes. On the other hand for static networks the requirement for routine signal reception may be satisfied if the relevant signal has been received for at least 90% of the time since network start-up. That is, the preceding predetermined time period may correspond to the length of time the network has been operational. Alternatively, the requirement may be satisfied if the relevant signal has been received continuously for the preceding 5 minutes. In certain embodiments the criterion for a slave 2 to be receiving a signal is whether that slave is able to 'track' the signal, e.g. by means known in the art of CDMA signal processing. In other embodiments the criterion may be for the received signal power to be above a predetermined threshold, e.g. a threshold in the range −90 to −110 dBm. It will be appreciated that the assessment of whether a given signal is being routinely received, for determination of the tier status of a slave, incorporates a historical element, distinct from the question of whether that signal is currently being received or currently serviceable. It is generally preferred for the criteria for assessing routine reception of a signal to be configurable.

In certain embodiments, during normal operation of the positioning network 28 the reference device 6 asserts that it is the 'active reference' and the alternate reference device 30 is in 'slave mode'. For reliable or robust operation of the network 28 it is important for the alternate reference device 30 to be able to exit slave mode and assume control of the network in the event of failure of the reference device 6 or, more generally, the reference signal 4 being or becoming unserviceable. Provided there is at least one Tier 1 slave 2-1 in the network 28 there will generally be a holdover period during which the network can maintain synchronisation via the unique positioning signal 24-B of the alternate reference device 30 in lieu of the reference signal 4. Although it is preferable for stability of network synchronisation for the alternate reference device 30 to assume control of the network as soon as possible, the alternate reference device 30 will generally have time during the holdover period to assess the serviceability of the reference signal 4 before asserting 'active reference' status and taking control of the network 28.

Ideally, only one of the reference device 6 and the alternate reference device 30 should be asserting 'active reference' status at any given time, although a defective reference device 6 could continue to assert this status despite its signal 4 being unserviceable. Accordingly, the positioning-unit devices 2 may be configured to ignore the reference signal 4 once the alternate reference device 30 has asserted 'active reference' status, or to ignore the reference signal 4 if they assess it to be unserviceable.

In certain embodiments the alternate reference device 30 acts unilaterally, exiting slave mode and taking control of the network 28 after determining that the reference signal 4 is unserviceable, based on measurements of one or more qualities such as received signal power, signal-to-noise ratio or signal continuity, of the reference signal 4 as received at the alternate reference device 30. For example if the received power of the reference signal 4 drops below a predetermined threshold, either instantaneously or continuously for a predetermined holdover period, the alternate reference device 30 may determine that the reference signal 4 is unserviceable and proceed to take control of the network. With the alternate reference device 30 now asserting 'active reference status', other positioning-unit devices 2 will seek to synchronise their signals 24 to the signal 24-B transmitted by the alternate reference device 30. The criteria for determining serviceability of the reference signal 4 are preferably configurable, able to be set according to system requirements. For example a predetermined threshold for received signal power may be in the range of −90 to −110 dBm, while a predetermined holdover period may be in the range of 0.5 to 18 seconds depending on the typical stability of the positioning-unit device clocks. This unilateral approach, however, risks the possibility of the alternate reference device 30 asserting control of the network erroneously, e.g. if a temporary occlusion prevents the alternate reference device 30 from receiving the reference signal 4 from a perfectly operational reference device 6.

In preferred embodiments the alternate reference device 30 additionally or alternatively obtains information on the reference signal 4 from at least one of the other positioning-unit devices 2 in the network 28, for further input to the assessment of reference signal serviceability. Preferably the alternate reference device 30 receives information on the reference signal routinely, e.g. via the data components of signals 24 from one or more of the other positioning-unit devices 2, although in other embodiments the alternate reference device 30 actively polls other positioning-unit devices 2. The reference signal information may comprise one or more measurements of a quality of the reference signal 4, such as received signal power, signal-to-noise ratio or signal continuity. Alternatively, the reference signal information may comprise an assessment of the serviceability of the reference signal 4, based for example on one or more measurements of a quality of the reference signal.

In preferred embodiments the alternate reference device 30 utilises reference signal information received 'first hand' from one or more Tier 1 slaves 2-1, i.e. from positioning-unit devices that routinely receive signals 4, 24-B from both the reference device 6 and the alternate reference device 30. Information may alternatively be received 'second hand', relayed via Tier 2 slaves 2-2, although this would generally only be necessary if there were no Tier 1 slaves 2-1 in the network 28. In preferred embodiments the alternate reference device 30 requires corroborative information on the reference signal 4 from a predetermined number or percentage of Tier 1 slaves 2-1 before proceeding to take control of the network 28. For example it may require corroborative information from at least one or two, or at least 50% to 100% of the Tier 1 slaves 2-1 before asserting control of the network. Generally, the duration of a predetermined holdover period during which the alternate reference device 30 assesses reference signal serviceability should be shorter than the duration of the time period used by the slaves 2 to determine their tier status, so that the alternate reference device 30 can obtain the desired reference signal information before the Tier 1 slaves 2-1 downgrade their tier status.

We now consider the situation of reference device 6 start-up. In preferred embodiments the reference device 6 is configured to check, at start-up, whether the network 28 is operational, i.e. whether it can receive signals 24 from one or more of the slaves 2 in the network, generally including the signal 24-B from the alternate reference device 30 asserting 'active reference' status. If the reference device 6 does not detect network signals during a first predetermined start-up period, which will be the situation at network start-up, it boots up as normal and asserts control of the network as the active reference. If, however, the reference device 6 does detect network signals 24 at start-up, which will be the case if it is recovering from a failure, it will enter the network 28 in slave mode, synchronising its signal 4 to a selected one of the detected signals, via the standard TLL process. Preferably, the reference device 6 will synchronise its signal 4 to the signal 24-B transmitted by the alternate reference device 30 if it detects that signal during the first predetermined start-up period, which may for example be in the range of 60 to 360 seconds.

In certain embodiments the reference device 6 remains in this state indefinitely, ready to assume control of the network should the alternate reference device 30 fail to provide a serviceable signal, using similar methodology to that described previously for the alternate reference device 30. Essentially, the reference device 6 and alternate reference device 30 will have swapped roles. In other embodiments, once the reference device 6 has synchronised its signal 4 to the network timebase, i.e. to a selected signal 24 from a synchronised positioning-unit device 2, it can seek to re-assert 'active reference' status in a negotiated handover from the alternate reference device 30. In preferred embodiments this is performed via the reference and alternate reference devices 6, 30 monitoring the appropriate data bits in the data components of each other's signals 24-B, 4 and responding accordingly. In one embodiment the synchronised reference device 6 flags that it is ready to resume control of the network, then resumes control after it receives approval from the alternate reference device 30, either immediately or at an agreed time. In other embodiments there is an additional level of negotiation, with the reference device 6 initially indicating readiness to resume control, followed by indication of intent to resume control at an agreed time. As the reference device 6 changes status to 'active reference' the alternate reference device 30 turns off its 'active reference' status and reverts to slave mode.

Figure 5:
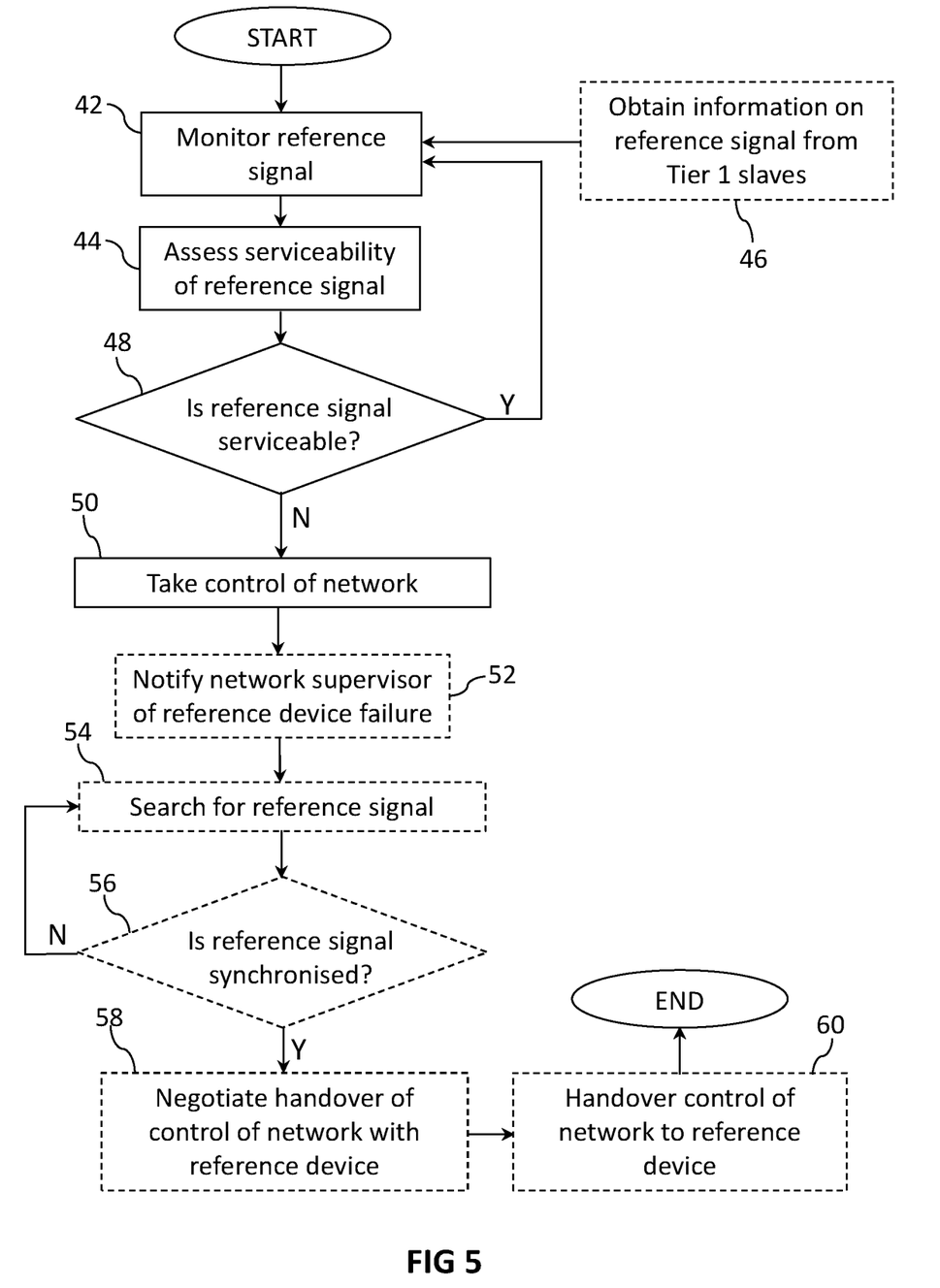
FIG. 5 is a flow chart depicting a method for operation of a positioning network according to an embodiment of the present invention, with a series of steps performed by an alternate reference device in maintaining continuity of network synchronisation.

A method for operation of a positioning network 28 according to an embodiment of the present invention is described with reference to the flow chart of FIG. 5, showing the steps performed by an alternate reference device 30 in maintaining continuity of network synchronisation through the loss of a serviceable reference signal 4. Optional steps are indicated by dashed outlines. Starting from a state where the alternate reference device 30 deems the network to be operating normally, with the network under the control of the reference device 6, the process begins in step 42 with the alternate reference device 30 routinely monitoring the reference signal 4, before assessing the serviceability of the reference signal in step 44. Optionally, as indicated by step 46, the alternate reference device 30 obtains information on the reference signal from one or more Tier 1 slaves 2-1, for additional input to the assessment of reference signal serviceability. At decision point 48 the alternate reference device determines whether the reference signal 4 is serviceable. If yes, the alternate reference device 30 returns to step 42. If not, it takes control of the network in step 50, e.g. by exiting slave mode and asserting 'active reference' status in the data component of its signal 24-B. Optionally, in step 52 the alternate reference device 30, or another of the positioning-unit devices 2, indicates to a network supervisor that there is a problem with the reference device 6, for fault determination or repair.

In certain embodiments the process ends there, with the positioning network 28 maintaining synchronisation under the control of the alternate reference device 30. In other embodiments the alternate reference device 30 searches for the reference signal 4 periodically or continuously in step 54, and at decision point 56 determines whether the reference device has synchronised its signal 4 to the network timebase. If not, the alternate reference device 30 returns to step 54 to continue searching for the reference signal, while maintaining 'active reference' status. If yes, the alternate reference device 30 and reference device 6 negotiate handover of control in step 58, before the alternate reference device hands control of the network back to the reference device in step 60. In this embodiment the process ends with the positioning network 28 maintaining synchronisation under the control of the reference device 6.

Figure 6:
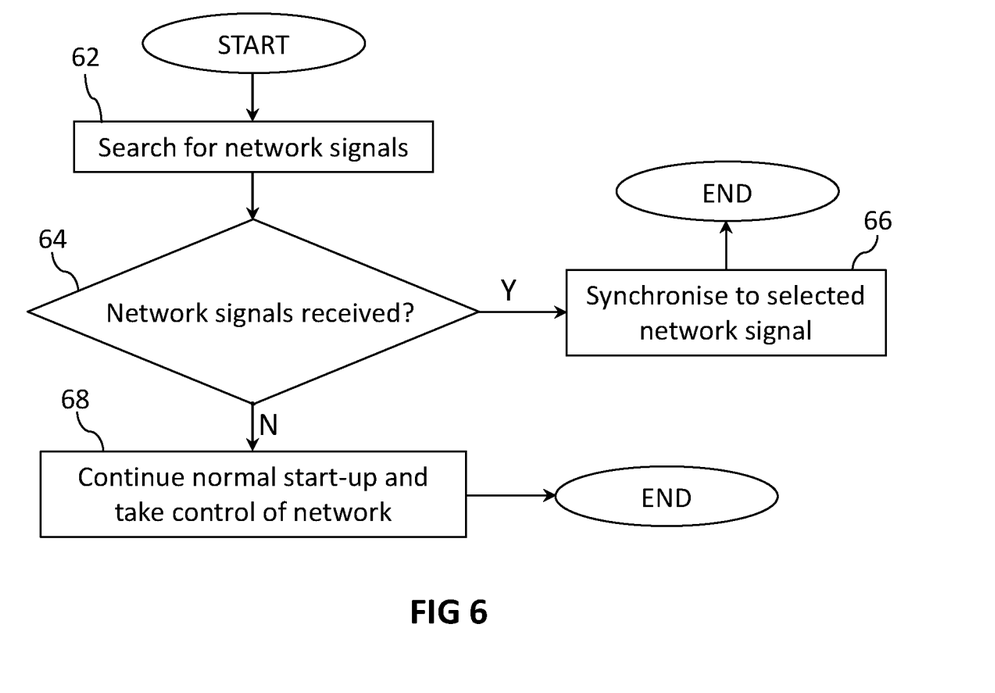
FIG. 6 is a flow chart depicting the steps performed at start-up by the reference device of a positioning network, according to an embodiment of the present invention.

FIG. 6 is a flow chart depicting the steps performed by the reference device 6 of a positioning network 28 when starting up, according to an embodiment of the present invention. In step 62 the reference device searches for signals 24 from one or more positioning-unit devices 2 in the network for a first predetermined start-up period, then at decision point 64 it determines whether it is receiving such network signals, possibly including a signal 24-B from the alternate reference device 30. If yes, which may be the case when the reference device 6 is coming back on line after a hardware failure, in step 66 it synchronises its signal 4 to a selected network signal 24, 24-B, i.e. starts up in slave mode. The process may end there, with the reference device remaining in slave mode, or the reference device may negotiate with the alternate reference device to take control of the network as explained previously with reference to FIG. 5. On the other hand if the reference device 6 determines that no network signals are present, which will generally be the case at network start-up, in step 68 it continues its normal start-up procedure and assumes control of the network 28.

In preferred embodiments the alternate reference device 30 is configured to behave in similar fashion to the reference device 6 when it starts up, except that it looks for network signals in a second predetermined start-up period that is preferably longer than the first predetermined start-up period used by the reference device 6, before concluding that the reference device is non-operational and accordingly asserting control over the network. At start-up of a positioning network 28 the expectation is that the reference and alternate reference devices 6, 30 will begin their start-up procedures around the same time, so that the first predetermined start-up period should end before the second predetermined start-up period. This is not essential, however, since if the second start-up period ends first the alternate reference device 30 will take control of the network and the reference device 6 will enter the network in slave mode. The second predetermined start-up period may for example be in the range of 1.5 to three times longer than the first predetermined start-up period.

In certain embodiments the resilience of a synchronised positioning network is further improved by designating, before network start-up, another of the positioning-unit devices 2 as a second alternate reference device should the reference device 6 and alternate reference device 30 both fail to provide serviceable signals, with definition of appropriate protocols for communication between the various members of the network. Yet more fall-back reference devices could be so designated if required, depending for example on the size of the network or the criticality of its uninterrupted operation.

In the previously described embodiments the timebase for the reference device 6, to be disseminated to the network 28 of positioning-unit devices 2, is internally generated by the reference device. Alternatively, the reference device may obtain a timebase from an external source. Such embodiments are useful for transferring a timebase, for example Universal Coordinated Time (UTC), to an extended network of positioning-unit devices, as well as to devices such as position receivers capable of receiving and processing signals from the network.

Figure 7:
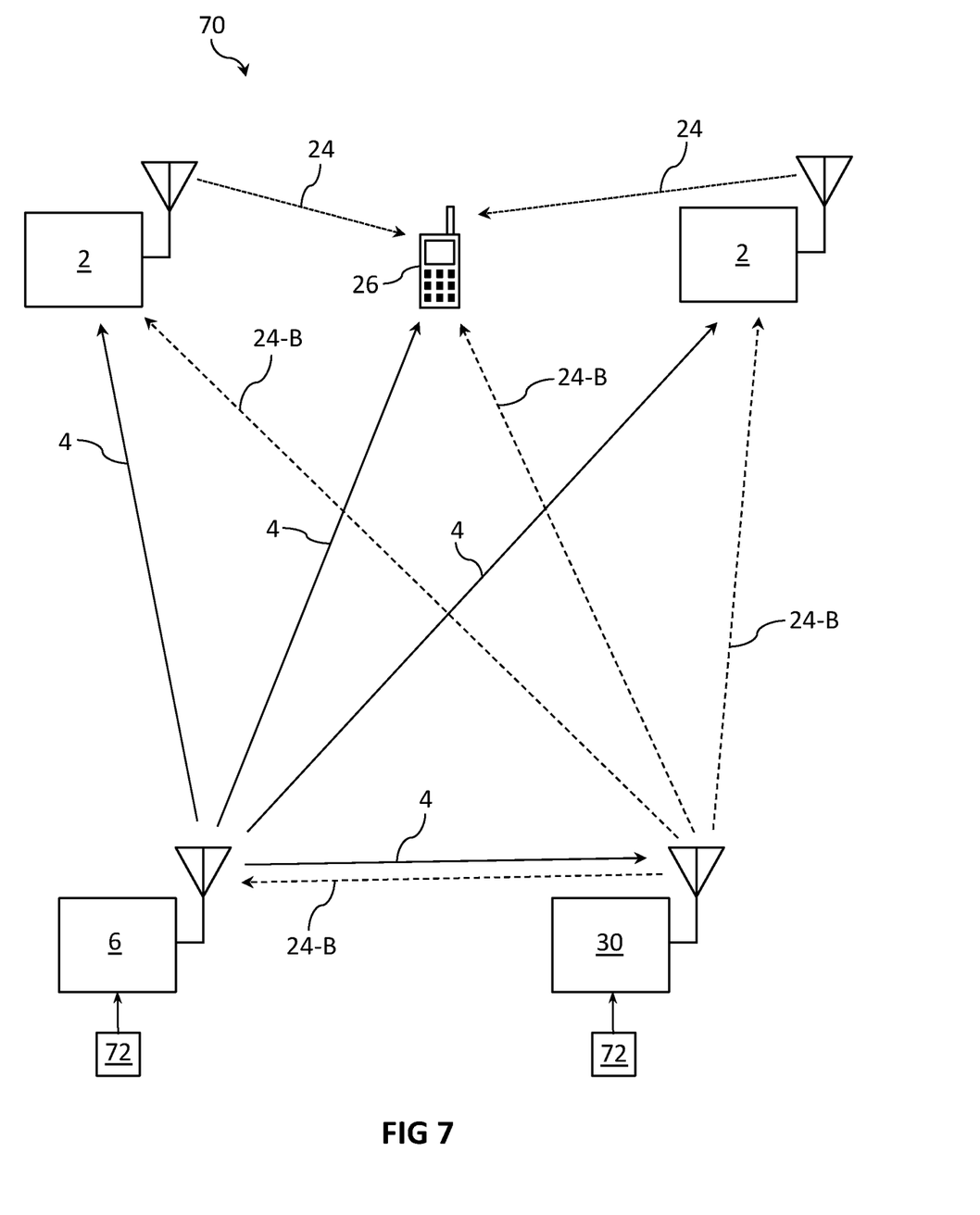
FIG. 7 illustrates a positioning network according to an embodiment of the present invention.

FIG. 7 depicts a positioning network 70 according to an embodiment of the present invention, comprising a reference device 6 and a plurality of positioning-unit devices 2, with a predetermined one of the positioning-unit devices being designated as an alternate reference device 30. The reference device 6 and alternate reference device 30 are each configured to be able to receive a timebase from an external source 72 and align their respective signals 4, 24-B to that timebase. Note that it is necessary for the alternate reference device 30 to be able to receive the external timebase, as well as the reference device 6, to ensure that the external timebase can be disseminated in the event of failure of the reference device 6. In preferred embodiments the external source 72 is a source of UTC, for example a Global Navigation Satellite System (GNSS) such as GPS, or an atomic clock steered to UTC. In other embodiments the reference device 6 and alternate reference device 30 are configured to be able to receive a timebase different from and possibly unrelated to UTC.

In normal operation of the network 70, the reference device 6 receives a timebase from an external source 72, then generates and transmits a reference signal 4 according to that timebase. Positioning-unit devices 2 that are in view of the reference device 6, preferably but not necessarily including the predetermined alternate reference device 30, receive the reference signal 4, then generate their own unique signals 24 and chronologically synchronise their signals to the received reference signal 4 using the TLL process described previously. Positioning-unit devices that are not in view of the reference device 6 are able to chronologically synchronise their signals to the reference signal 4 by receiving and synchronising to signals transmitted by positioning-unit devices that have already been synchronised to the reference signal 4. The signals 24 transmitted by an arbitrarily large number of positioning-unit devices can, therefore, be aligned with the timebase obtained from the external source 72, disseminating this timebase across an arbitrarily large area or distance. Devices such as position receivers 26 capable of receiving and processing signals 4, 24, 24-B from the network can, therefore, receive this timebase, which may advantageously be UTC, in addition to being able to calculate position solutions.

In this normal operation mode the predetermined alternate reference device 30 behaves as a standard positioning-unit device in the network 70, synchronising its unique signal 24-B to the reference signal 4, effectively ignoring the external source 72. However if the alternate reference device 30 determines that the reference device 6 is not transmitting a serviceable reference signal 4, either unilaterally or with consideration of information on the reference signal from one or more of the other positioning-unit devices 2, it switches to an 'active reference' mode, synchronising its unique signal 24-B to the timebase obtained from the external source 72. Other positioning-unit devices 2 can then synchronise their signals 24 to the signal 24-B transmitted by the alternate reference device, either by direct reception of this signal 24-B or by cascading, enabling the external timebase to be transferred in the absence of a serviceable reference signal 4.

Apart from the source of the timebase to which the networked positioning-unit device signals are synchronised, operation of the network 70 described with reference to FIG. 7 is analogous to the operation of the network 28 described with reference to FIGS. 3 and 4. In general the same protocols will apply, for example for determining whether the alternate reference device 30 should take control of the network or hand control back to the reference device 6.

Although the invention has been described with reference to specific examples, it will be appreciated by those skilled in the art that the invention may be embodied in many other forms.

What is claimed is:

1. A positioning network comprising:
   a designated reference device configured to generate and transmit a reference signal according to a timebase for said designated reference device; and
   a plurality of positioning-unit devices, each of said positioning-unit devices being configured to generate a unique positioning signal and chronologically synchronise said unique positioning signal to said reference signal,
   wherein a predetermined one of said positioning-unit devices is configured to:
   (i) monitor said reference signal;
   (ii) assess the serviceability of said reference signal; and
   (iii) take control of the positioning network in the event it determines that said reference signal is unserviceable, such that other positioning-unit devices can chronologically synchronise their unique positioning signals to the unique positioning signal of the predetermined positioning-unit device, thereby maintaining or establishing synchronisation of said network despite said reference signal being unserviceable.

2. The positioning network according to claim 1, wherein the monitoring of said reference signal comprises measuring a quality of said reference signal as received at said predetermined positioning-unit device.

3. The positioning network according to claim 1, wherein the predetermined positioning-unit device is configured to obtain information on said reference signal from at least one other of said positioning-unit devices, for use in assessing the serviceability of said reference signal.

4. The positioning network according to claim 3, wherein said information comprises one or more measurements of a quality of said reference signal.

5. The positioning network according to claim 3, wherein said information comprises an assessment of the serviceability of said reference signal.

6. The positioning network according to claim 5, wherein said assessment is based on one or more measurements of a quality of said reference signal.

7. The positioning network according to claim 3, wherein the predetermined positioning-unit device is configured to obtain information on said reference signal from one or more other positioning-unit devices that routinely receive said reference signal and routinely receive the unique positioning signal from said predetermined positioning-unit device.

8. The positioning network according to claim 7, wherein each of the other positioning-unit devices is configured to determine that it routinely receives a signal if it has received that signal for at least a predetermined percentage of a preceding predetermined time period.

9. The positioning network according to claim 7, wherein each of said other positioning-unit devices is configured to broadcast whether it routinely receives said reference signal or the unique positioning signal from said predetermined positioning-unit device.

10. The positioning network according to claim 2, wherein said quality of said reference signal comprises received signal power, signal-to-noise ratio or signal continuity.

11. The positioning network according to claim 1, wherein said designated reference device is configured, when starting up, to:
    search for unique positioning signals from one or more of said positioning-unit devices; and
    synchronise its signal to a selected one of said unique positioning signals if it detects that unique positioning signal within a first predetermined start-up period.

12. The positioning network according to claim 11, wherein said designated reference device is configured to synchronise its signal to the unique positioning signal of said predetermined positioning-unit device if that signal is detected.

13. The positioning network according to claim 11, wherein said designated reference device and said predetermined positioning-unit device are configured to negotiate return of control of the positioning network to said designated reference device after said designated reference device has synchronised its signal to one of said unique positioning signals.

14. The positioning network according to claim 1, wherein said designated reference device and said predetermined positioning-unit device are configured to be able to receive said timebase from an external source, such that said timebase can be transferred to said plurality of positioning-unit devices or to one or more position receivers.

15. In a positioning network comprising a designated reference device configured to generate and transmit a reference signal according to a timebase for said designated reference device, and a plurality of positioning-unit devices each configured to generate a unique positioning signal and chronologically synchronise said unique positioning signal to said reference signal, a method for maintaining or establishing synchronisation of said network in the absence of a serviceable reference signal, said method comprising the steps of a predetermined one of said positioning-unit devices:

(i) monitoring said reference signal;
(ii) assessing the serviceability of said reference signal; and
(iii) taking control of the positioning network in the event it determines that said reference signal is unserviceable, such that other positioning-unit devices can chronologically synchronise their unique positioning signals to the unique positioning signal of said predetermined positioning-unit device, thereby maintaining or establishing synchronisation of said network despite said reference signal being unserviceable.

16. The method according to claim 15, wherein the step of monitoring said reference signal comprises measuring a quality of said reference signal as received at said predetermined positioning-unit device.

17. The method according to claim 15, wherein the step of monitoring said reference signal comprises obtaining information on said reference signal from at least one other of said positioning-unit devices, for use in assessing the serviceability of said reference signal.

18. The method according to claim 17, wherein said information comprises one or more measurements of a quality of said reference signal.

19. The method according to claim 17, wherein said information comprises an assessment of the serviceability of said reference signal.

20. The method according to claim 19, wherein said assessment is based on one or more measurements of a quality of said reference signal.

21. The method according to claim 17, wherein the predetermined positioning-unit device obtains information on said reference signal from one or more other positioning-unit devices that routinely receive said reference signal and routinely receive the unique positioning signal from said predetermined positioning-unit device.

22. The method according to claim 21, wherein each of the other positioning-unit devices determines that it routinely receives a signal if it has received that signal for at least a predetermined percentage of a preceding predetermined time period.

23. The method according to claim 21, wherein each of said other positioning-unit devices broadcasts whether it routinely receives said reference signal or the unique positioning signal from said predetermined positioning-unit device.

24. The method according to claim 16, wherein said quality of said reference signal comprises received signal power, signal-to-noise ratio or signal continuity.

25. The method according to claim 15, wherein said designated reference device, when starting up:
searches for unique positioning signals from one or more of said positioning-unit devices; and
synchronises its signal to a selected one of said unique positioning signals if it detects that unique positioning signal within a first predetermined start-up period.

26. The method according to claim 25, wherein said designated reference device synchronises its signal to the unique positioning signal of said predetermined positioning-unit device if that signal is detected.

27. The method according to claim 25, wherein said designated reference device and said predetermined positioning-unit device negotiate return of control of the positioning network to said designated reference device after said designated reference device has synchronised its signal to one of said unique positioning signals.

28. The method according to claim 15, wherein said designated reference device and said predetermined positioning-unit device are able to receive said timebase from an external source, such that said timebase can be transferred to said plurality of positioning-unit devices or to one or more position receivers.

* * * * *